US012335268B2

(12) United States Patent
Gyarmathy, Jr. et al.

(10) Patent No.: US 12,335,268 B2
(45) Date of Patent: Jun. 17, 2025

(54) SCENARIO-BASED ACCESS CONTROL

(71) Applicant: Microsoft Technology Licensing, LLC, Redmond, WA (US)

(72) Inventors: James Paul Gyarmathy, Jr., Shoreline, WA (US); Ali Alam, Sammamish, WA (US); Amanda Holcomb, Gig Harbor, WA (US); Alka Garg, Redmond, WA (US); Ayyappan Balasubramanian, Redmond, WA (US); Mansi Singhal, Redmond, WA (US); Gerardo Bodegas Martinez, Kirkland, WA (US); Michael Todd, Mill Creek, WA (US); Carrie Ann Culley, Seattle, WA (US); Hardeep Kohli, Bothell, WA (US); Can Zheng, Sammamish, WA (US); Rohan Kamath, Issaquah, WA (US); Sandhya Vankamamidi, Redmond, WA (US); Jing Jing, Beijing (CN); Zhuang Gao, Kirkland, WA (US); John Kingsly Masilamani, North Bend, WA (US); Jack Pullikottil, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 132 days.

(21) Appl. No.: 18/032,126

(22) PCT Filed: Oct. 22, 2021

(86) PCT No.: PCT/US2021/056285
§ 371 (c)(1),
(2) Date: Apr. 14, 2023

(87) PCT Pub. No.: WO2022/115186
PCT Pub. Date: Jun. 2, 2022

(65) Prior Publication Data
US 2023/0412602 A1    Dec. 21, 2023

(30) Foreign Application Priority Data
Nov. 24, 2020 (LU) ......................... 102215

(51) Int. Cl.
*G06F 21/00* (2013.01)
*H04L 9/40* (2022.01)

(52) U.S. Cl.
CPC .......... *H04L 63/101* (2013.01); *H04L 63/108* (2013.01)

(58) Field of Classification Search
CPC ...... H04L 63/101; H04L 63/108; H04L 63/20
See application file for complete search history.

(56) References Cited

U.S. PATENT DOCUMENTS 7,827,196 B2 * 11/2010 Victor ................ G06F 11/3684
717/124
8,959,580 B2 * 2/2015 Lim ...................... H04L 63/20
726/1

(Continued)

OTHER PUBLICATIONS

"Notice of Allowance Issued in European Patent Application No. 21810487.5", Mailed Date: Oct. 2, 2023, 9 Pages.
(Continued)

*Primary Examiner* — Kendall Dolly
(74) *Attorney, Agent, or Firm* — Schwegman Lundberg & Woessner, P.A.

(57) ABSTRACT

Methods, systems, and computer programs are presented for managing access to resources using scenarios. One method includes an operation for storing first scenario data received for a first control scenario. The first scenario data comprises a control scenario identifier, a first resource, an authorization control, and a scenario trigger that defines an event that causes an activation of the first control scenario for providing access to the first resource. Further, the method includes operations for monitoring for an occurrence of the scenario
(Continued)

trigger and detecting an occurrence of the event associated with the scenario trigger. Further, the method determines, in response to the occurrence of the event, a set of users authorized to access the first resource, including accessing the first scenario data to determine the set of users associated with the authorization control. Furthermore, access is provided to the set of users based on the determining.

15 Claims, 10 Drawing Sheets

(56) References Cited

U.S. PATENT DOCUMENTS

| | | | | |
|---|---|---|---|---|
| 9,071,626 | B2* | 6/2015 | Morris | H04L 63/104 |
| 10,178,101 | B2* | 1/2019 | Dintenfass | H04L 63/105 |
| 11,063,940 | B2* | 7/2021 | Hemaraju | H04L 63/102 |
| 11,467,553 | B2* | 10/2022 | Short | G06F 3/017 |
| 11,526,603 | B2* | 12/2022 | Makhlevich | H04L 63/20 |
| 11,593,165 | B2* | 2/2023 | Pavlin | G06F 9/50 |
| 2005/0125688 | A1* | 6/2005 | Ogawa | H04L 41/0894 726/1 |
| 2008/0015889 | A1* | 1/2008 | Fenster | G06Q 40/12 705/317 |
| 2012/0216243 | A1* | 8/2012 | Gill | G06F 21/55 726/1 |
| 2013/0057384 | A1* | 3/2013 | Morris | H04L 67/1095 340/5.74 |
| 2014/0157351 | A1* | 6/2014 | Canning | H04W 12/37 726/1 |
| 2014/0173755 | A1* | 6/2014 | Wahl | G06F 21/6218 726/28 |
| 2014/0359127 | A1* | 12/2014 | Linares | H04L 41/0893 709/226 |
| 2016/0226858 | A1* | 8/2016 | Pritchard, Jr. | H04L 63/0815 |
| 2017/0272121 | A1* | 9/2017 | Dao | H04W 4/70 |
| 2018/0048517 | A1* | 2/2018 | Stern | H04L 65/40 |
| 2019/0182121 | A1* | 6/2019 | Karnes | H04L 41/0654 |
| 2020/0065811 | A1* | 2/2020 | Sloane | G06Q 20/3672 |
| 2020/0125050 | A1* | 4/2020 | Short | G06F 3/017 |
| 2020/0204556 | A1* | 6/2020 | Smith | G06F 21/6218 |
| 2020/0279041 | A1* | 9/2020 | Endler | G06F 21/554 |
| 2021/0397478 | A1* | 12/2021 | Pavlin | G06F 9/5011 |
| 2022/0078797 | A1* | 3/2022 | Helms | G06F 3/02 |
| 2022/0092197 | A1* | 3/2022 | Sakowicz | G06F 9/5027 |
| 2022/0180247 | A1* | 6/2022 | Chow | G06N 20/00 |
| 2023/0179617 | A1* | 6/2023 | Yavo | G06N 20/00 726/23 |
| 2023/0344822 | A1* | 10/2023 | Sloane | H04L 41/16 |
| 2023/0370322 | A1* | 11/2023 | Arzani | H04L 41/0631 |
| 2024/0241927 | A1* | 7/2024 | Richman | G06F 21/6218 |

OTHER PUBLICATIONS

"Git—everything-is-local", Retreived from: https://git-scm.com/, Retrieved Date: Jun. 24, 2020, 2 Pages.

"HL7 Role-Based Access Control (RBAC) Role Engineering Process", Retrieved from: https://csrc.nist.gov/csrc/media/projects/role-based-access-control/documents/hl7_role-based_access_control_(rbac).pdf, Sep. 19, 2007, 24 Pages.

Weststrate, et al., "MobX", Retrieved from: https://github.com/mobxjs/mobx, Jun. 27, 2020, 14 Pages.

"Semantic UI React", Retrieved from: https://react.semantic-ui.com, Retrieved Date: Jun. 24, 2020, 5 Pages.

Hagnelius, et al., "Typewriter", Retreived from: https://github.com/frhagn/Typewriter, Apr. 21, 2019, 3 Pages.

"Search Report Issued in Luxembourg Patent Application No. LU102215", Mailed Date: Aug. 16, 2021, 11 Pages.

Ma, et al., "An Access Control Method based on Scenario Trust", In International Journal of Computational Intelligence Systems, vol. 5, No. 5, Sep. 2012, pp. 942-952.

"International Search Report & Written Opinion issued in PCT Application No. PCT/US21/056285", Mailed Date : Feb. 3, 2022, 12 Pages.

Peleg, et al., "Situation-Based Access Control: Privacy Management via Modeling of Patient Data Access Scenarios", In Journal of Biomedical Informatics, vol. 41, Issue 6, Dec. 2008, pp. 1028-1040.

Schuster, et al., "Situational Access Control in the Internet of Things", In Proceedings of the ACM SIGSAC Conference on Computer and Communications Security, Oct. 15, 2018, pp. 1056-1073.

"TypeScript is JavaScript with Syntax for Types", Retrieved From: https://www.typescriptlang.org/, Retrieved Date: Jun. 24, 2020, 9 Pages.

Communication under Rule 71(3) EPC Received for European Application No. 21810487.5, mailed on Jan. 5, 2024, 09 pages.

"Decision to Grant Issued in European Patent Application No. 21810487.5", Mailed Date: Jan. 25, 2024, 2 Pages.

\* cited by examiner

```
┌─────────────────────────────────────────────────┐
│ CREATE SCENARIO                              ✕  │
│                          310 ┌────────┬───────┐ │
│                              │ SUBMIT │ CLOSE │ │
│       DETAILS           304  └────────┴───────┘ │
│ 302 ─ SCENARIO NAME *                           │
│       ┌─────────────────────────────────────┐   │
│       │ SAMPLE ENGINEERING DATA ANALYTICS   │   │
│       └─────────────────────────────────────┘   │
│       DESCRIPTION *                             │
│       ┌─────────────────────────────────────┐   │
│       │ RUN AD-HOC QUERIES TO VALIDATE ACCESS FOR│
│       │ ENGINEERING                         │   │
│       └─────────────────────────────────────┘   │
│       TENANT *                                  │
│       ┌─────────────────────────────────────▼┐  │
│       │ TENANT 1                             │  │
│       └──────────────────────────────────────┘  │
│       ACCESS NEEDS (CONSUMER AND/OR ENTERPRISE *│
│       ┌─────────────────────────────────────▼┐  │
│       │ ENTERPRISE                           │  │
│       └──────────────────────────────────────┘  │
│       DATA TYPES*                               │
│       ┌─────────────────────────────────────▼┐  │
│       │ PERSONAL, OLL/TENANT AGGREGATED      │  │
│       └──────────────────────────────────────┘  │
│       DATA USES *                               │
│       ┌─────────────────────────────────────▼┐  │
│       │ DELIVER THE SERVICE, INCIDENT RESPONSE│ │
│       └──────────────────────────────────────┘  │
│       ORGANIZATION VISIBILITY *                 │
│       ┌─────────────────────────────────────▼┐  │
│       │ PRIVATE                              │  │
│       └──────────────────────────────────────┘  │
│       APPROVERS (MIN 3 FTE) COMMA SEPARATED ALIASES│
│       (*REQUIRED FOR PUBLIC SCENARIOS)          │
│       ┌─────────────────────────────────────▼┐  │
│       │                                      │  │
│       └──────────────────────────────────────┘  │
│       FTE ONLY *                                │
│       ┌─────────────────────────────────────▼┐  │
│       │ YES                                  │  │
│       └──────────────────────────────────────┘  │
│       AUTO-APPROVE USE *                        │
│       ┌─────────────────────────────────────▼┐  │
│       │ NO                                   │  │
│       └──────────────────────────────────────┘  │
│       PERIODIC APPROVAL (365 DAYS) REQUIRED *   │
│       ┌─────────────────────────────────────▼┐  │
│       │ YES                                  │  │
│       └──────────────────────────────────────┘  │
│                                         306     │
│       DATA ELIGIBILITIES                        │
│       CLICK ON THE DATA ELIGIBILITY FOR ADDITIONAL│
│       DETAILS ON THE DATA ACCESS THIS SCENARIO GRANTS│
│       ┌──────────────────────────────────────┐  │
│       │ ENGINEERING.ADHOCAD. AND DB ACCESS   │  │
│       │ PROD DATA ACCESS                     │  │
│       │ ACCESS TO BUSINESS DATA              │  │
│       └──────────────────────────────────────┘  │
│       ┌────────────────────┐                    │
│       │ ADD DATA ELIGIBILITY│ ─ 308             │
│       └────────────────────┘                    │
└─────────────────────────────────────────────────┘
```

FIG. 3

CREATE DATA ELIGIBILITY ✕

402 — DATA ELIGIBILITIES CREATE THE RIGHT TO ACCESS DATA AFTER SATISFYING THE REQUIRED CONDITIONS (APPROVAL, CLEARANCES, TRAINING). THESE ELIGIBILITIES MUST BE AT THE LOWEST LEVEL OF GRANULARITY TO PROVIDE LEAST ACCESS TO DATA. MULTIPLE DATA ELIGIBILITIES CAN BE GROUPED TOGETHER IN A SCENARIO FOR EFFICIENCY.

NAME \*

3-50 CHARACTER LENGTH, STARTING WITH ALPHABET, ONLY LETTERS (A-Z), NUMBERS(0-9), SPACES AND HYPHENS (-) ARE ALLOWED

DESCRIPTION \*

DESCRIPTION (MAX 1000 CHARS)

ELIGIBILITY APPROVERS (MIN 3 FTE) TAB SEPARATED ALIASES\*

LOCKBOX APPROVERS (MIN 1) TAB SEPARATED ALIASES \*

PRIVACY REVIEW \*

M365

CLEARANCES

BACKGROUND CHECK, TRAINING

TENANT \*

TENANT 1 OR TENANT 2

ORGANIZATION VISIBILITY

ANY

DATA SET(S)
IDENTIFY THE DATA SET THAT THIS ELIGIBILITY WILL PROVIDE ACCESS TO. DATA SETS ARE DERIVED FROM THE M365 DATA CATALOG AND ARE AT AN APPROVED LEVEL OF GRANULARITY FOR LEAST-PRIVILEGE ACCESS. IF ACCESS TO MULTIPLE DATA SETS IS REQUIRED, CREATE MULTIPLE DATA ELIGIBILITIES AND TIE TO A SCENARIO.

[ ADD DATA SET ] — 404

SAMPLE.PROD.UPLOAD ✕

[ SUBMIT ] [ CLOSE ]
406

FIG. 4

SCENARIO-BASED ACCESS CONTROL

CLAIM FOR PRIORITY

This application is a U.S. National Stage Filing under 35 U.S.C. 371 of International Patent Application Serial No. PCT/US2021/056285, filed Oct. 22, 2021, and published as WO 2022/115186 A1 on Jun. 2, 2022, which application claims the benefit of priority of Luxembourg Patent Application No. LU102215, filed Nov. 24, 2020, which applications and publication are hereby incorporated by reference in their entirety.

TECHNICAL FIELD

The subject matter disclosed herein generally relates to methods, systems, and machine-readable storage media for managing access to resources.

BACKGROUND

Access control systems today focus on identifying user roles and classifications to grant access to individual resources (e.g., door locks, file folders, programs, webpages). These resources can number in the tens of thousands for an enterprise and are managed by different individuals or teams, which creates a management nightmare for managers, including issues of access, security, obsolescence, privacy, resources, efforts to keep current, etc.

What is needed is a solution that scales for large numbers of assets and users to reduce the complexity of managing controlled access to the assets.

BRIEF DESCRIPTION OF THE DRAWINGS

Various of the appended drawings merely illustrate example embodiments of the present disclosure and cannot be considered as limiting its scope.

FIG. 3 is a user interface for creating a scenario, according to some example embodiments.

FIG. 4 is a user interface for creating data eligibilities, according to some example embodiments.

DETAILED DESCRIPTION

Figure 1:
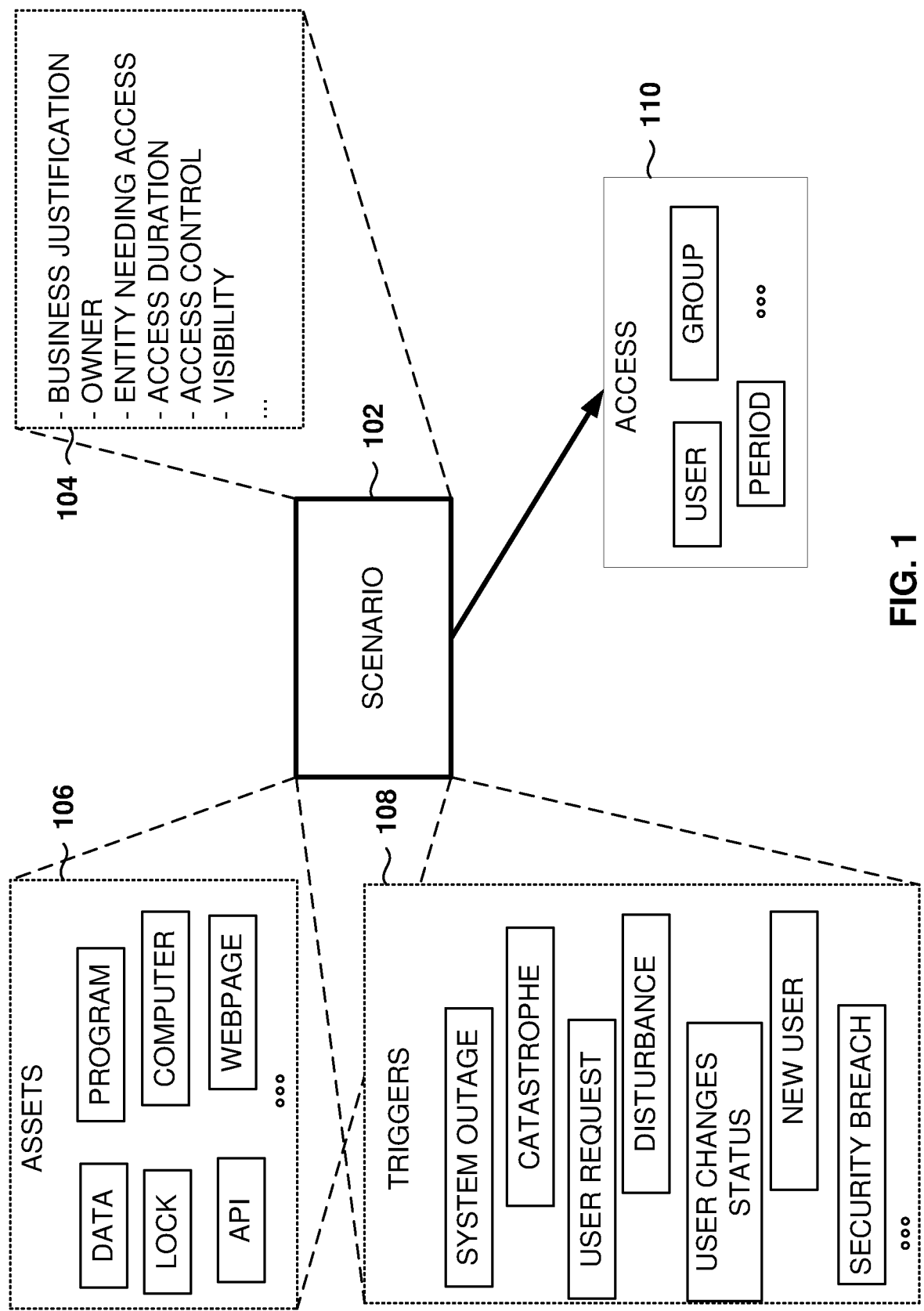
FIG. 1 presents some of the components of a scenario, according to some example embodiments.

Example methods, systems, and computer programs are directed to managing access to resources using scenarios that define how access to the resources is granted, based on scenario-defined access controls and event triggers for providing access to the users. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments, it will be evident to one skilled in the art, however, that the present subject matter may be practiced without these specific details.

In some aspects, the system uses scenarios to manage asset control. The scenarios define approved access controls, to identified assets, that are visible to those users identified in the scenario configuration. Access to assets, also referred to herein as nodes, is restricted to just those scenarios that have been approved, and the access control is maintained by owners who determine the population of users that should be able to create scenarios (e.g., security scenarios for security teams) and maintain approval control for specific access.

The scenarios define specific conditions when access is required (e.g., system outage, cyber-attack, political or social unrest, security incident, legal request, audit request, feature development/release, new user), the type of data access allowed (e.g., personal, organization identifiable information (OII), aggregated, system metadata), how the access can be used (e.g., perform system changes, investigate logs, extract and aggregate telemetry data), and triggers that can activate the scenario (e.g., manual request, internal or external event, time period, fire). Access eligibilities are tied directly to these scenarios, which identify the specific access that will be granted when the scenario is triggered.

One general aspect includes a method that includes an operation for storing, in a computer memory, first scenario data received for a first control scenario. The first scenario data comprises a control scenario identifier, a first resource, an authorization control, and a scenario trigger that defines an event that causes an activation of the first control scenario for providing access to the first resource. Further, the method includes operations for monitoring for an occurrence of the scenario trigger and for detecting an occurrence of the event associated with the scenario trigger of the first control scenario. Further, the method determines, in response to the occurrence of the event, a set of users authorized to access the first resource, where determining the set of users includes accessing the stored first scenario data to determine the set of users associated with the authorization control. Furthermore, the method includes an operation for providing access to the set of users based on the determining.

FIG. 1 presents some of the components of a scenario, according to some example embodiments. A scenario 102 is a scheme that defines how access to assets 106 is controlled and includes, at least, a definition of assets under control, users that may gain access, type of access given to the users, triggers 108 that may activate the change of access for one or more users, authorization mechanism to give user access to the assets, and visibility criteria that indicates which users have visibility to the scenario 102.

The assets 106 may be of any kind, such as data, a door lock, a program, a computer (e.g., a personal computer, a server), a cloud service, a webpage, an Application Programming Interface (API), and so forth.

When defining the scenario, the creator defines one or more scenario parameters 104, also referred to as attributes, such as a business justification for getting access to the assets, owner of the scenario 102 (the owner can add, delete, or modify all the scenario data), the entity—or entities—that can get access (e.g., person, group, partner company), the duration of the access (e.g., six months, until canceled), access control that defines how access is given (e.g., automatic access given based on a given trigger, authorization by the scenario owner), visibility (which users can see that the scenario is available), and so forth. In some example embodiments, the visibility may be triggered by an event, such that the scenario 102 will not be visible until a certain condition takes place.

The trigger 108 is any event or condition that will cause a change in the access, by one or more users, to one or more assets. Some examples of triggers 108 include a system outage, a catastrophe (natural or man-made), a user request, a social disturbance, the change of status of the user (e.g., a new user, a user leaving the company), a security breach detected, and so forth.

When the conditions defined in the scenario 102 provide access to one or more users, the access 110 is granted. The access may be granted to a user, a group of users, for a defined period of time, or until a trigger causes the change of access privileges.

The scenario both simplifies and increases the security of tens of thousands of assets that are individually accessed in large organizations by creating an access abstraction layer that adds the "Why" vector to the current access paradigms. It also allows the integration of external triggers to allow and remove access to access points that are pre-created, approved, auditable, and configurable to meet the needs of organizations struggling to manage the tens of thousands of assets in their organizations.

Approved scenarios are exposed to appropriate populations (e.g., security scenarios to security teams) where users can request and gain access using the scenario after the appropriate approvals (e.g., managers, owners, privacy) and events are triggered. Here are some examples of scenarios:

Access required for all "new employees" is defined in a "Baseline Employee Access" scenario that includes access to resources such as employee policies, meal cards, and career resources. New employees can request, and be granted, access to the scenario and required resources at on-boarding time, instead of having to individually request access to all required assets.

A team is a group of users working together within an organization, such as users reporting to the same manager, users working on development of a new product, users providing customer support, etc. Thus, a team is one way of defining a group of users that may be granted access within a scenario. A "Team Baseline Access" scenario provides access for the employees in a specific team to assets, such as source repositories, team sites, and system read access. When a member leaves the team, the scenario will automatically revoke access for this member.

A team creates a scenario that provides limited access to protected data for use only for defined patterns. This scenario may be added to the "ream Baseline Access" scenario creating a scenario of scenarios pattern.

A disaster-response team defines a scenario for access to specific buildings (e.g., shelters) by local users (users physically located within the disaster-impact area) during defined emergencies (e.g., tornado, hurricane). The scenario for local users is linked to state emergency services and location of the users so that when the event is declared, access is immediately and automatically granted, without requiring human intervention. Access to the buildings is revoked after the emergency has passed or the users have left the area, mitigating access creep over time. This scenario may include another scenario, "Region Visitors," that allows access to visiting non-employees.

The privacy team determines a scenario for access to protected data, and access is only allowed for specific reasons to protect data privacy.

The scenario is a layer above other existing access control processes, such as server access control by a group of users. For example, a typical access control can be for a single door and a lock to let someone through that door. Companies may have hundreds or thousands of these access locks and hundreds or thousands of employees, and access has to be configured for each door and each employee, e.g., a key for each employee. This means that, over time, users may end up having lack of access, or too much access, and management is complex and resource intensive.

Adding access is easier with the scenario because it is possible to define what the scenario is fir and why access is needed. Also, when the condition for the access expires, the scenario cuts the access automatically. For example, when an access timer expires, a scenario-manager program modifies data structures defining access, such as to change the access parameter for a given user from access allowed to access disallowed.

For example, a data scientist needs access to certain data to do work with the data. There are two things the data scientist needs: to know where the data is and how to get access to the data. The data scientist, using the scenario infrastructure, requests access to the data and provides the reasons why the access is needed (e.g., for compliance), who is going to use the data, for how long, and so forth. The scenario system may automatically provide access, or the proper authorization mechanism is put in place so an administrator reviews the request, and if approved, provides the access via the scenario infrastructure.

Thus, scenarios are used to solve two problems: complexity and scalability. Groups of qualified users may be defined for each scenario. By creating security groups within the scenarios, complexity is managed by greatly reducing the effort required to manage many assets and many users. Further, scalability is provided by using the groups within the scenarios to control access, since additional users added to existing groups can automatically benefit from the access provided to those groups within the scenarios.

Compliance is another problem that is managed better with scenarios. Compliance conditions may be imposed on the scenarios, so guaranteeing compliance is automatic. Further, if compliance conditions change (e.g., new regulation), then changing one or few scenarios is often enough to provide compliance for the changing conditions.

Figure 2:
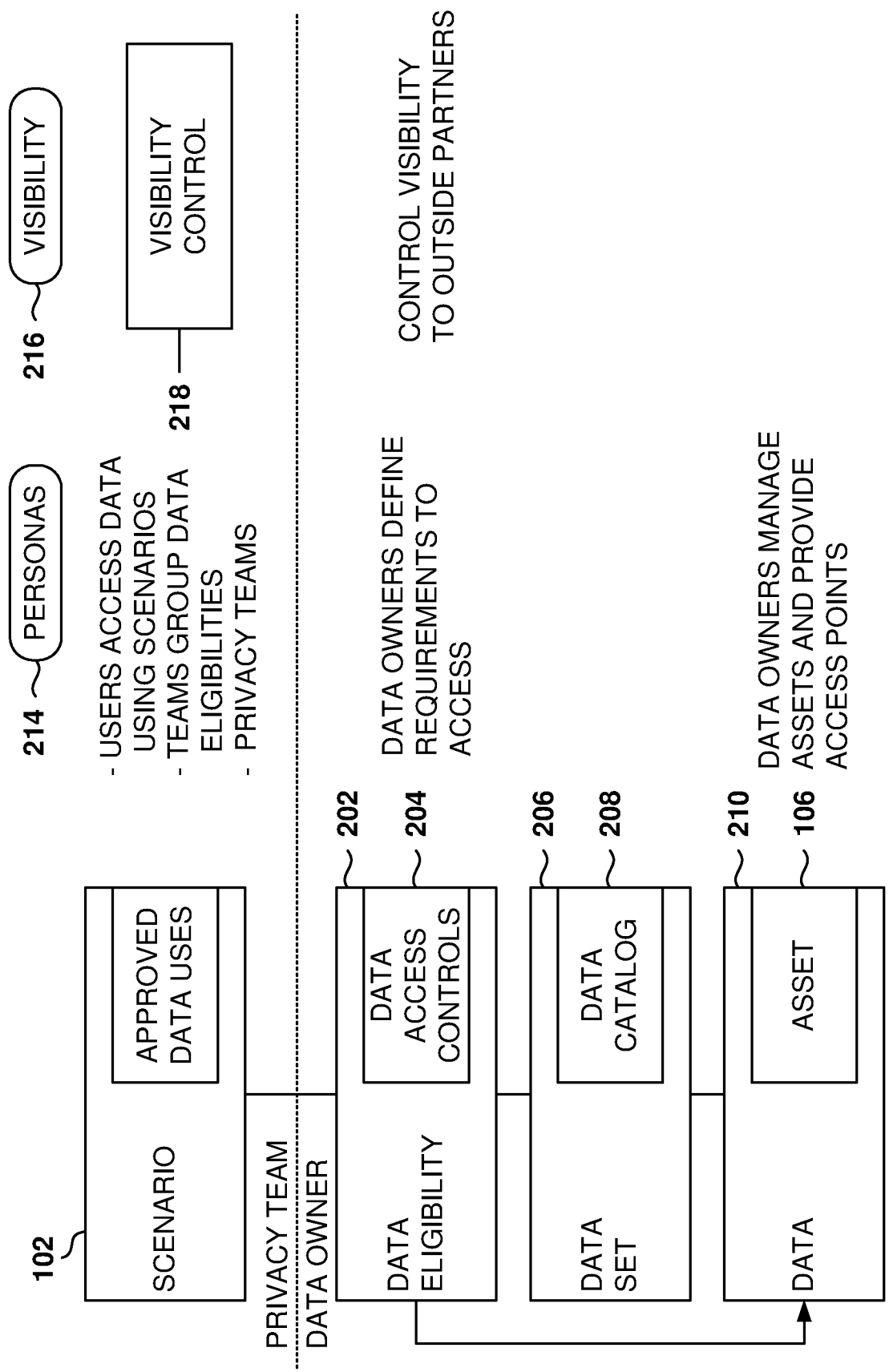
FIG. 2 shows how scenario data and access control is provided, according to some example embodiments.

FIG. 2 shows how scenario data and access control is provided, according to some example embodiments. Data 210 defines the asset 106 being protected and the owner of the resource controls access.

Further, a data set 206 is metadata around the data 210 and provides information about the data 210. For example, for a key to a house, the data set defines one or more of the house, the location of the house, the location of the lock, the type of lock, when the lock was installed, and so forth. A data catalog, 208 is a data store that holds the data set.

A data catalog 208 is a collection of assets owned by the organization, and the data set 206 defines which assets from the data catalog 208 are included in the scenario 102. Each asset in the data catalog 208 has information about the asset, such as the accounting cost associated with the asset.

Data eligibility 202 defines who can access the data 210, such as title requirement, security clearance, time with the company, employment status, and so forth. The data owners define the requirements for providing access. Data access controls 204 provide the controls to the asset 106 as specified by the data eligibility 202, e.g., read-only access, edit access, manager access (authorize access to users, revoke access).

The scenario 102 uses the data eligibility 202 and the data set 206 to control the data 210. The scenario creating includes a workflow that determines what the data 210 is for that scenario and how approval is provided (automatically or by approval from an administrator of the scenario).

Once the scenario 102 is created, the scenario is available and visible 216 to the users with authorization to view the scenario 102. These users with visibility to the scenario 102 may now request access to the asset 106. Other users will not have visibility to the scenario 102 so they will not be able to request access. Some scenarios may define universal visibility and be visible to all users. In some example embodiments, the visibility 216 is based on the organization hierarchy, e.g., people in this division or people working under certain director can gain visibility within a given scenario. In some cases, the information regarding organizational structure is obtained from human resources systems or from a directory system (e.g., Lightweight Directory Access Protocol (LDAP), an industry standard application protocol for accessing and maintaining distributed directory information services).

For example, a critical resource may be accessible only to the members of a security team, and the scenario will not be visible to people outside the security team. This provides an additional level of security because other users are not aware of the scenario itself and the resources controlled by the scenario.

The scenario 102 defines the group of users, also referred to as personas 214, who have access to the scenario, and the use of groups simplifies access management. A persona 214 may be a single user, or a group of users, such as users employed by a partner company. Further, controlling the visibility 216 enables visibility control 218 to determine which users may know about the existence of the scenario 102.

For example, a security manager desires to give access to a certain resource (e.g., a data storage, a server) to members of a partner company, which includes 500 members. Managing 500 users would take a lot of time to configure if the security manager has to give access one by one, especially if there are multiple assets that need to be accessed. However, by creating a scenario 102 that identifies the partner members (e.g., with a defined email domain name, a list of users) and the required resources, the security manager is able to quickly provide this access to 500 users. After creating the scenario, the 500 users will have visibility to the scenario 102 and are able to request access, which may be provided automatically when the conditions defined in the scenario are satisfied (e.g., validating an email in the given email domain) or may be reviewed by an administrator for authorization.

Further, the scenario 102 provides an audit mechanism by keeping track of the assets being approved for access, which users obtain access, why the access was given, the date that the access was given, and so forth. Further, it is noted that different types of access might be provided to the users, such as read only or edit privileges for a certain file.

FIG. 3 is a user interface 302 for creating a scenario, according to some example embodiments. The user interface 302 includes a details section 304 and a data eligibilities section 306.

The details section 304 includes fields for entering scenario data, such as scenario name, description of the scenario, tenant (e.g., system owning the asset such as an active directory), the access needs for the scenario (e.g., enterprise, read, edit), the data types, the data uses (e.g., to deliver a service), the visibility within the organization (e.g., only to scenario-approved users, universal, company), approvers for access requests, employment type of requester (e.g., only full-time employees, contractors), automatic approval when conditions are met, and period for which approval is given (e.g., maximum of six months).

In some example embodiments, the user interface 302 further includes access conditions, not shown, (e.g., system outage, cyber-attack, political or social unrest, security incident), and scenario triggers (e.g., manual, system event) tied to external trusted systems (e.g., specific access should be granted to the backup on-call engineers when an incident is declared).

The data eligibilities section 306 lists the data eligibilities already defined for the scenario and a button 308 that provides an option to add additional data eligibilities. If selected, another interface is presented to add the data eligibility, such as the one illustrated in FIG. 4. Once the information is entered, pressing the button 310 causes the submittal of the information to generate the scenario.

Certain values in the data eligibility may generate additional requirements or information. For example, if the user is a vendor, the system may validate that the vendor holds a required certification.

Table 1 below illustrates some example data access configuration options regarding visibility and use. Further, some examples are provided on the right column:

TABLE 1

| Visibility Data eligibility | Visibility Scenario | Use | Examples |
| --- | --- | --- | --- |
| N/A | Private | Data access for single user | User needs access to specific data for specific scenario |
| Team | Team | Eligibilities and scenario viewed only by team | Visibility limited outside Team |
| Team | Engineering | Team shares access to engineering for specific scenarios | Partner scenario for shareable data |
| Team or Engineering | All | Team shares access to all for specific scenarios | Finance needs access to Team data |
| Engineering | Team | Engineering data used by team | Team creates scenario for use of data |

TABLE 1-continued

| Visibility Data eligibility | Visibility Scenario | Use | Examples |
| --- | --- | --- | --- |
| Engineering | Engineering | Eligibilities used in scenarios created by Engineering | Broad data sharing |
| All | | Not allowed. Scenario not visible outside engineering | |

In some example embodiments, a data structure for scenario registration includes the following fields:
Id: unique row ID;
Version: numeric version number of the data structure;
Status: type of the most recent event;
SubmitterId: person who submitted the scenario registration;
Duration: amount of time that this scenario qualifies candidates for access to the selected assets;
Assets: collection of one or more assets required to implement the scenario;
AssetId: identity of one scenario-specific asset to which the attester needs access;
AssetFabric: indication of Cosmos, SQL, ADLS, PBI, etc. (specificity for assets published to two or more fabrics);
AssetGroup: security group whose membership governs access to the asset;
Properties: dictionary of other properties that describe collective characteristics of the assets selected for the scenario;
HasPersonal: True if at least one asset selected for the scenario contains Personal information;
HasTenant: True if at least one asset selected for the scenario is a Tenant aggregate;
HasCommercial: True if at least one asset selected for the scenario contains Commercial data;
HasConsumer: True if at least one asset selected for the scenario contains Consumer data;
HasMsSales: True if at least one asset selected for the scenario requires Sales clearance;
Candidates: collection of one or more persons who qualify for access to assets if the scenario is approved;
CandidateId: identity of the candidate;
CandidateType: FTE (full time employee) or Vendor;
Events: collection of events that describe the life cycle and audit trail of the registration;
EventType: Submitted, Approved, Denied, Expired;
EventTime: when the event occurred;
EventMessage: short description of the event;
CreatedTime: time of the first event;
ModifiedTime: time of the most recent event; and
ExpirationTime: time when this registration will expire.

In some example embodiments, a data structure for individual attestation includes the following fields:
Id: unique row ID;
Version: numeric version number of the data structure;
Status: type of the most recent event;
ScenarioId: a registered and approved scenario as the basis for attestation (probably row ID of a scenario registration);
Participants: collection of one or more persons participating in the Attestation;
ParticipantId: identity of the participant;
ParticipantRole: Attester (person submitting the attestation) or applicant (person to be granted access);
ParticipantType: FTE or Vendor;
ParticipantDepartment: department of the participant (used to recognize transfers within the company);
Assets: collection of one or more scenario-specific assets to which the applicant may be granted access;
AssetId: identity of one scenario-specific asset to which the attester needs access;
AssetFabric: indication of Cosmos, SQL, ADLS, PBI, etc.;
AssetGroup: security group whose membership governs access to the asset;
Checks: collection of zero or more validity checks required for the target asset (depends on audience, aggregate level, etc.);
CheckType: training, group, possibly other enumerative values;
CheckTarget: ID of required training, ID of a group to which the attester belongs;
CheckResult: result (training status, group membership, etc.);
Events: collection of events that describe the life cycle and audit trail of the attestation;
EventType: Submitted, Approved, Denied, Notified, Expired, Revoked;
EventTime: when the event occurred;
EventMessage: short description of the event (revoked for what reason, etc.);
CreatedTime: time of the first event;
ModifiedTime: time of the most recent event; and
ExpirationTime: time when this attestation will expire (e.g., 90 days after approval).

FIG. 4 is a user interface 402 for creating data eligibilities, according to some example embodiments. The user interface 402 includes fields for entering a name for the data eligibility, a description, one or more eligibility approvers, zero or more lockbox approvers, a type of privacy review (e.g., level of data privacy for access), zero or more clearances (e.g., prerequisites) required, a directory tenant, visibility within the organization, and one or more data sets.

The lockbox approval is for a different type of approval, which is more strict than the regular eligibility approval. For example, the general approval may be to read data and the lockbox approval is for getting rights to change the data.

A button 404 provides an option to add more data sets, and selecting the button 404 will provide a different user interface for adding a new data set. Once the information is entered by the user, a submit button 406 is available to complete the addition of the data eligibility.

Figure 5:
FIG. 5 is a user interface showing data eligibilities, according to some example embodiments.

FIG. 5 is a user interface 502 showing data eligibilities 504, according to some example embodiments. The user interface 502 is presented to a user that wants to request access. The data eligibility defines the access provided to this user for the assets listed.

The scenarios available to the user are presented in a table 506 that lists all the scenarios are visible to this user. In some example embodiments, the table 506 includes the name of the eligibility, the name of the scenario, the service principal, a status of the scenario (e.g., active, rejected, expired, pending approval), and an expiration date.

In this example, the user has three data eligibilities on the first three rows tied to the same scenario Engineering Data Analytics, and all have a status of Active (approved). Further down, there are another three eligibilities tied to the same scenario Data Governance Access, with one eligibility being active, another one pending approval, and a third one as rejected.

Further, on the two bottom rows, there are two eligibilities Security 3 to the same asset, and although one is expired, the other one is still active so the user may access this asset.

Figure 6:
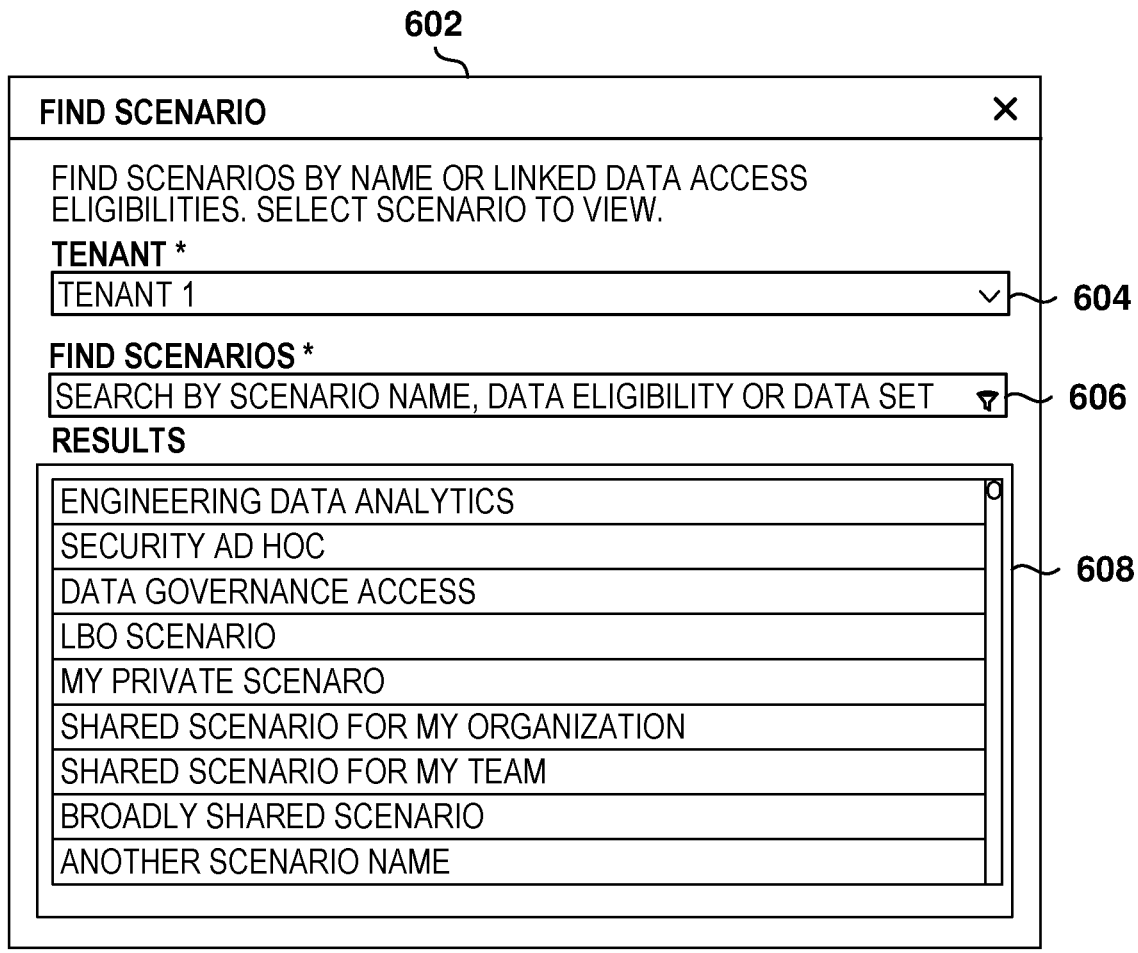
FIG. 6 is a user interface for finding available scenarios for a user, according to some example embodiments.

FIG. 6 is a user interface 602 for finding available scenarios for a user, according to some example embodiments. The user interface includes search entry fields, which may be left empty for a universal search. The first entry field 604 is for defining a tenant for the assets (e.g., a domain that controls a subset of the assets), and a second entry field 606 is for entering search query text.

The results 608 are presented in a window and the user may select any of the results to open another user interface for interacting with that scenario, such as to see a list of assets, access already given, pending requests, or to request access.

It is noted that the embodiments illustrated in FIGS. 3-6 are examples and do not describe every possible embodiment. Other embodiments may utilize different fields, layouts, additional fields, fewer fields, and so forth. The embodiments illustrated in FIGS. 3-6 should therefore not be interpreted to be exclusive or limiting, but rather illustrative.

Figure 7:
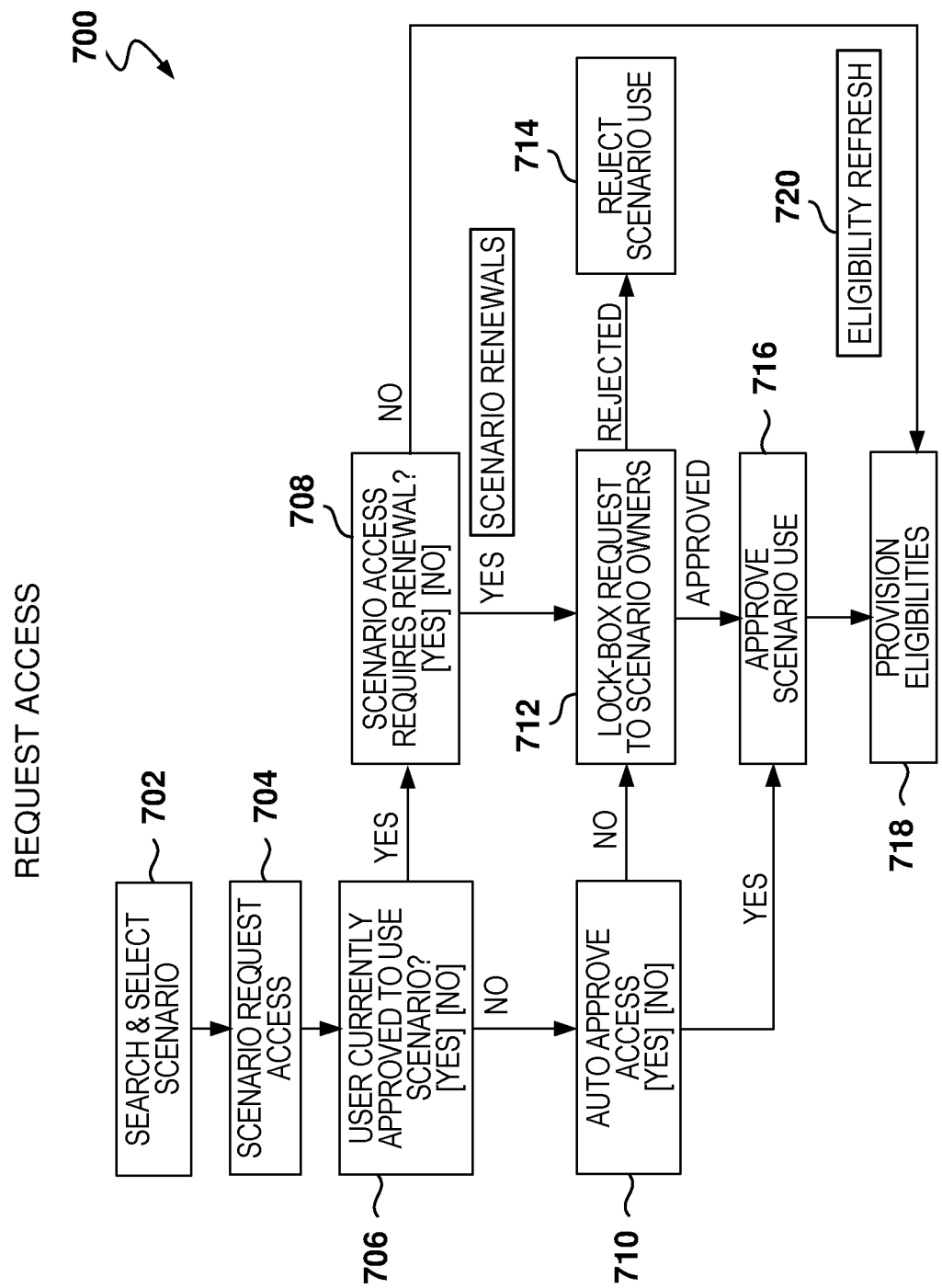
FIG. 7 is a flowchart for requesting access to a scenario-controlled asset, according to some example embodiments.

FIG. 7 is a flowchart 700 for requesting access to a scenario-controlled asset, according to some example embodiments. While the various operations in this flowchart are presented and described sequentially, one of ordinary skill will appreciate that some or all of the operations may be executed in a different order, be combined or omitted, or be executed in parallel. In some example embodiments, the method is implemented by the scenario manager 810 described below with reference to FIG. 8.

Operation 702 is for searching a scenario and selecting one scenario to request access for one or more assets associated with the selected scenario.

From operation 702, the method flows to operation 704 to detect a scenario request access. At operation 706, a check is made to determine if the user is currently approved to use the scenario, e.g., by checking if the user is one of the users currently approved for access to the resource aider the control scenario. If the user is currently approved, the method flows to operation 708, and if the user is not approved, the method flows to operation 710 for an eligibility refresh 720 to renew the eligibility for access.

At operation 710, a check is made to determine if the scenario is automatically approved. If the scenario is automatically approved, the method flows to operation 716, and if the scenario is not automatically approved, the method flows to operation 712.

At operation 708, a check is made to determine the scenario access requires renewal of the asset approval. If the scenario access does not require renewal, the method flows to operation 718, and if the scenario access requires renewal, the method flows to operation 712.

At operation 712, a check is made to determine if the scenario owner approves the access request. If the access request is rejected, the method flows to operation 714 for rejecting the access to the resource. In the access request is approved, the method flows to operation 716, where the access to the asset is approved.

At operation 718, the approved request is provisioned by performing the required control changes that enable the use of the asset by the user (e.g., configuring an active directory, enabling a key of the user to unlock a door.

Figure 8:
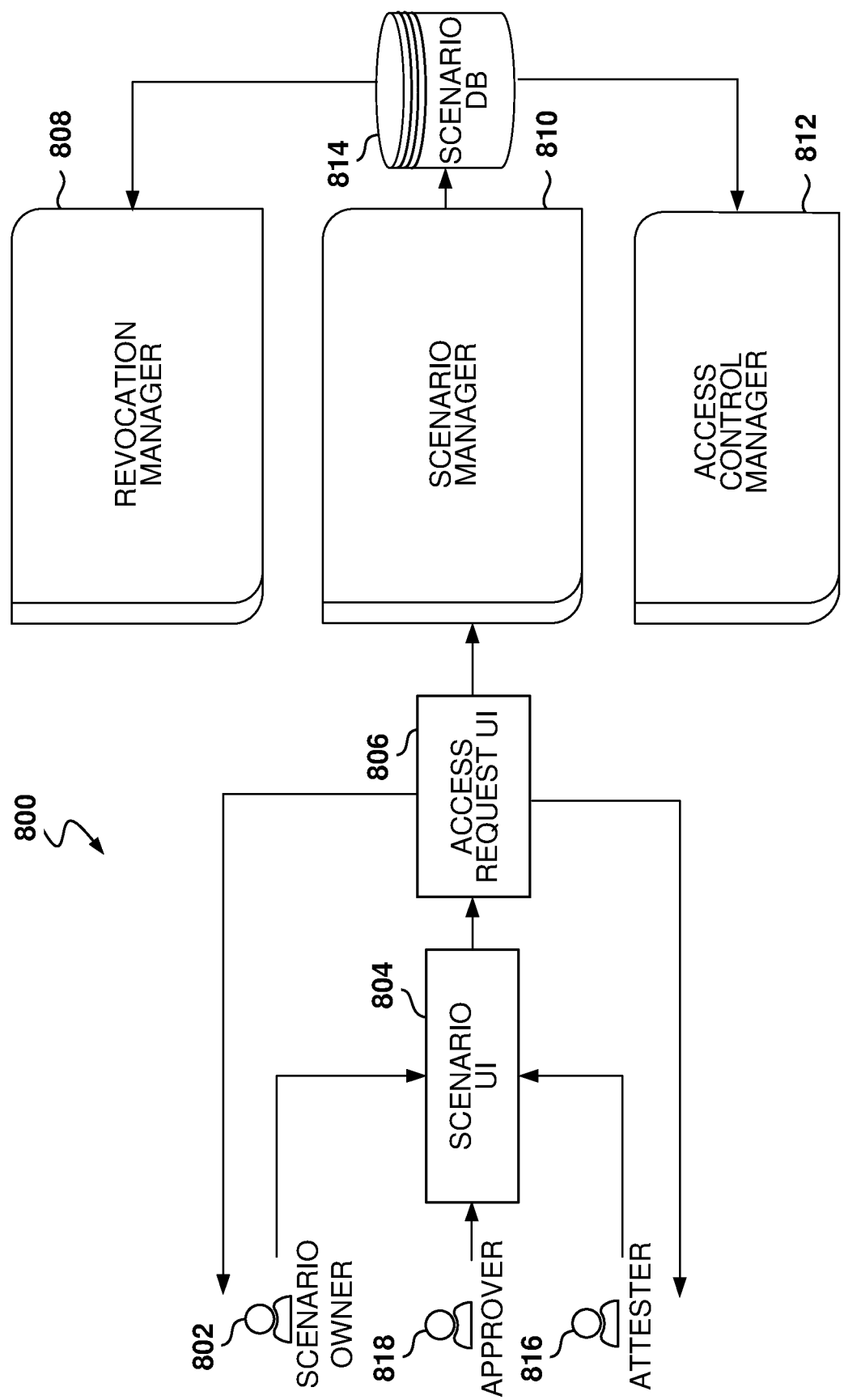
FIG. 8 is a sample architecture for the implementation of access-control scenarios, according to some example embodiments.

FIG. 8 is a sample architecture 800 for the implementation of access-control scenarios, according to some example embodiments. There are three types of users: a scenario owner 802, an approver 818, and an attester 816,. The scenario owner 802 creates the scenario.

The approver 818 approves or rejects the scenario. The approver may be one or more experts that understand the nuances of the compliance requirements, such as if the use proposed for this data is acceptable according to company compliance rules, any constraints, and the purposes for using the assets.

The attester 816 is attests that all the requirements for getting asset access are satisfied (e.g., the data eligibilities). In general, there is a business justification for providing access to an asset, and the attester guarantees that the conditions required for access to the asset are satisfied. The attester 816 may, for example, validate that the user requesting access has finished a training course required for access in the data, or past a security check,.

The scenario user interface manager 804 provides the user interfaces to the three types of users for doing scenario-related operations. Access request UI manager 806 manages access-request operations.

A scenario manager 810 manages scenario operations, such as creating a scenario, updating the scenario, deleting the scenario, validating attestation, and so forth.

Further, a revocation manager 808. which is a computer program, ensures that all accesses granted are current and revokes access when scenario conditions determine it, such as when the time period granted for access expires.

An access control manager 812 performs the operations required to give access to users when the access to assets is granted. For example, the access control manager may give access to a lock, to a file server, to a webpage, or to a directory in a file system.

A scenario database 814 includes the scenario data, such as scenarios created, and includes, for each scenario, access requirements, data eligibilities, groups of users, access granted, and so forth.

The scenario system makes managing assets and access requests manageable. For example, individual data accesses are associated with security groups, which can be in one or more domains, such as a Microsoft Active Directory™, an example of an LDAP director. In each of those directories, there will be one security group corresponding to each asset that contains the population of persons or identities who have successfully tested for access. Those same groups may be mapped to assets, such as permissions on the folders in Azure Datalink space, and to permissions on the shares of a file director.

Further, the revocation manager 808 checks to see if a user's access right to an asset has expired, and if so, ends access for the user. The user will then need to submit a new request for access.

In some example embodiments, an API is provided to perform scenario operations. Table 2 below shows some of the API functions supported:

TABLE 2

| Workflow | API function |
| --- | --- |
| Create Scenario | CreateScenario: API to save the Scenario Item information |
| | Change scenario state to be pending |
| | Find current user's manager |
| | Send mail to direct manager with the |
| | Send mail to direct manager with the approve/reject link |
| | Create record about the fan-out data eligibilities |
| | Check if the Scenario Name is unique |
| | Check if the Approvers alias are valid |
| | Check the Scenario owner's Clearances (Existing IDM API) |
| | GetDataEligibilities: which Data Eligibilities can be added into this Scenario |
| | GetData Types: Find out which Data Types can be selected |
| | GetDatause: API to find out which Data Uses can be selected |
| Update Scenario | ModifyScenario: API to modify the scenario information |
| View Scenario (Access Tab) | GetScenarios(State = All, owner = CurrentUser): find out which Scenarios current user can view |
| | GetScenarioInfo: Get Scenario information, like Id, Name, Owners, Status, Expiration Date, and when user click one scenario to inspect, need the full information for the scenario |
| View Scenario | GetPendingScenarios(approver): Get the scenarios which are pending on approval |
| | Approver: direct manager, privacy manager |
| Find Scenario | GetScenarios (State = granted, owner = All, user = CurrentUser): get all Granted Scenarios which current user can see |
| | QueryScenario: Query scenario with filter like Tenant, Name, Data Eligibility, Data Set, etc. |
| Approve Scenario by direct manager or Privacy Manager | ApproveScenario(scenarioIds, approver): Approve the scenarios |
| | Approver: direct manager, privacy manager |
| | Privacy manager approver: |
| | Check if all privacy teams has approved the scenario, if true, then, set the scenario state to be Approved |
| | If direct manager approves |
| | Check if this scenario needs Privacy Manager's approval |
| | Get privacy teams |
| | Send mail to privacy managers with the approve/reject link if necessary |
| | Send email to the requestor for change |
| | RejectScenario(scenarioIds, approver): Reject the scenarios |

Figure 9:
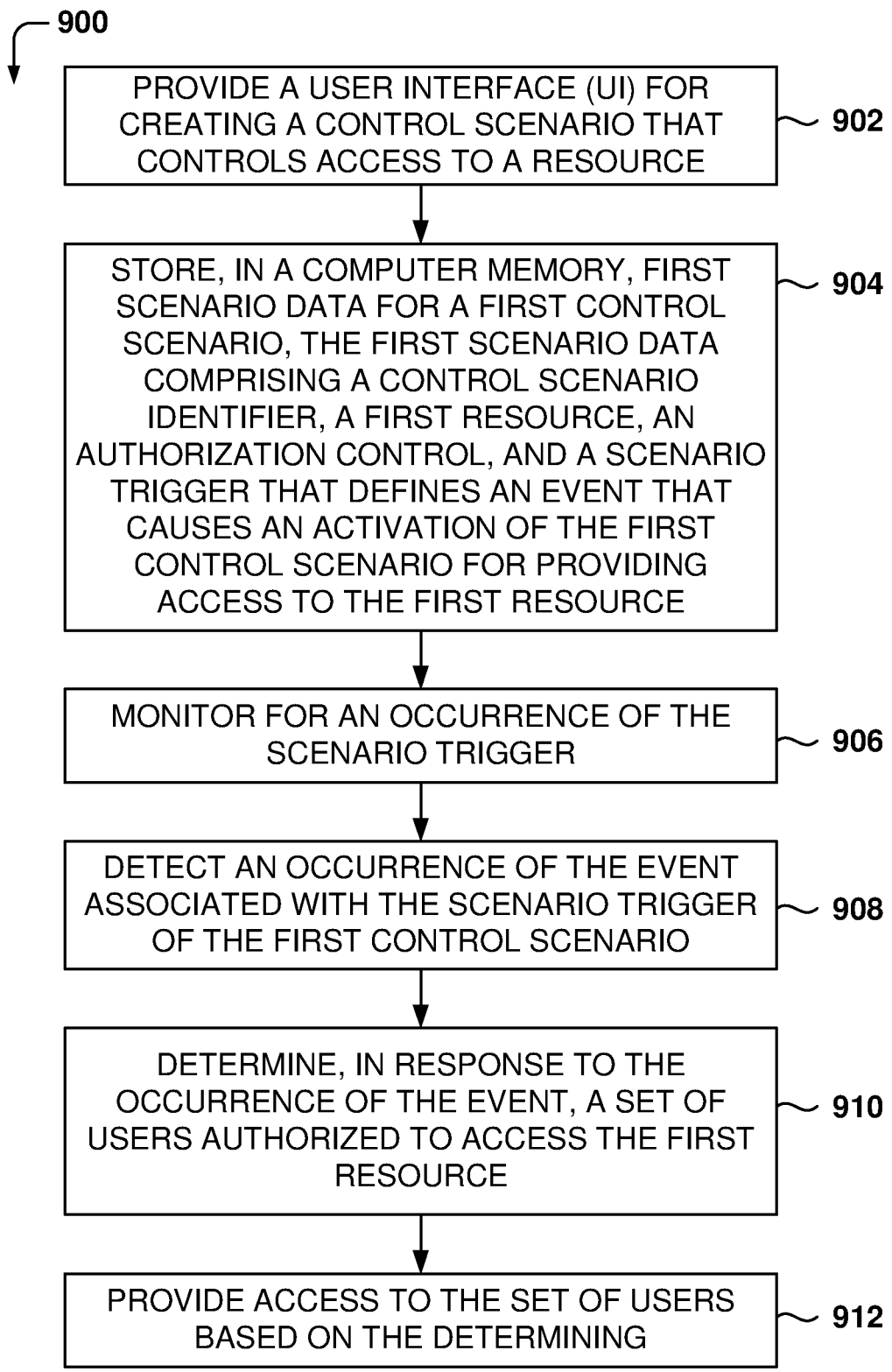
FIG. 9 is a flowchart of a method for managing access to resources using scenarios, according to some example embodiments.

FIG. 9 is a flowchart of a method 900, according to some example embodiments, for managing access to resources using scenarios. While the various operations in this flowchart are presented and described sequentially, one of ordinary skill will appreciate that some or all of the operations may be executed in a different order, be combined or omitted, or be executed in parallel.

At operation 902, a scenario UI is provided for creating a control scenario that controls access to a resource.

From operation 902, the method 900 flows to operation 904 to store, in a computer memory, first scenario data received for a first control scenario, the first scenario data comprising a control scenario identifier, a first resource, an authorization control, and a scenario trigger that defines an event that causes an activation of the first control scenario for providing access to the first resource.

From operation 904, the method 900 flows to operation 906 for monitoring for an occurrence of the scenario trigger.

From operation 906, the method 900 flows to operation 908 for detecting an occurrence of the event associated with the scenario trigger of the first control scenario.

From operation 908, the method 900 flows to operation 910 to determine, in response to the occurrence of the event, a set of users authorized to access the first resource, where determining the set of users includes accessing the stored first scenario data to determine the set of users associated with the authorization control.

Further, at operation 912, access is provided to the set of users based on the determining.

In one example, monitoring for an occurrence of the scenario trigger comprises detecting one or more of: a catastrophic event, a social disturbance, a request for access to the resource from a user, a system outage, a new member added to a group associated with the first control scenario, a member leaving the group associated with the first control scenario, or a security breach,.

In one example, the method 900 further comprises providing a requester user interface to a first user from the set of users authorized to access the first resource, the requester user interface including control scenarios visible to the first user, the control scenarios including the first control scenario, the requester user interface including an option for requesting access to the first resource of the first control scenario.

In one example, the user interface for creating the control scenario includes options for inputting one or more of the control scenario identifier, the first resource, the authorization control, the scenario trigger, and criteria for visibility of the control scenario to users.

In one example, the method 900 further comprises making the first control scenario visible via the scenario UI to the set of users authorized to access the first resource.

In one example, the first scenario data further comprises a definition of a scenario set of users eligible for requesting access to the first resource in the first control scenario, wherein the first control scenario is made visible to the scenario set of users via the scenario UI.

In one example, the authorization control is a mechanism which automatically provides access to the set of users authorized to access the first resource when the occurrence of the event associated with the scenario trigger is detected.

In one example, the authorization control comprises a mechanism which creates an authorization request for review by an administrator of the first control scenario when the occurrence of the event associated with the scenario trigger is detected.

In one example, the first scenario data further comprises an expiration date for the first control scenario.

In one example, the first resource is one or more of a door lock, data stored on a memory, a program, a web page, and an application programming interface.

In one example, the first resource is a resource managed by an active directory, wherein providing access to the set of users based on the determining comprises submitting a request to the active directory to enable access to the first resource by the set of users authorized to access the first resource.

In one example, the method 900 further comprises providing an attesting UI for attesting that requirements, for accessing assets controlled by the control scenario, are met by a requesting user.

Another general aspect is for a system comprising means to perform method 900.

Another general aspect is for at least one machine-readable media including instructions that, when executed by a machine, cause the machine to perform method 900.

Another general aspect is for a computer program comprising instructions which, when executed by a processor, implement the method 900.

Another general aspect is for a system that includes a memory comprising instructions and one or more computer processors. The instructions, when executed by the one or more computer processors, cause the one or more computer processors to perform operations comprising: providing a UI for creating a control scenario that controls access to a resource; storing, in a computer memory, first scenario data for a first control scenario in response to input received in the UI for the first control scenario, the first scenario data comprising a control scenario identifier, a first resource, an authorization control, and a scenario trigger that defines an event that causes an activation of the first control scenario for providing access to the first resource; monitoring for an occurrence of the scenario trigger; detecting an occurrence of the event associated with the scenario trigger of the first control scenario; determining, based on the stored first scenario data and the occurrence of the event, a set of users authorized to access the first resource; and providing access to the set of users based on the determining.

In yet another general aspect, a machine-readable storage medium (e.g., a non-transitory storage medium) includes instructions that, when executed by a machine, cause the machine to perform operations comprising: providing a UI for creating a control scenario that controls access to a resource; storing, in a computer memory, first scenario data for a first control scenario in response to input received in the UI for the first control scenario, the first scenario data comprising a control scenario identifier, a first resource, an authorization control, and a scenario trigger that defines an event that causes an activation of the first control scenario for providing access to the first resource; monitoring for an occurrence of the scenario trigger; detecting an occurrence of the event associated with the scenario trigger of the first control scenario; determining, based on the stored first scenario data and the occurrence of the event, a set of users authorized to access the first resource; and providing access to the set of users based on the determining.

Figure 10:
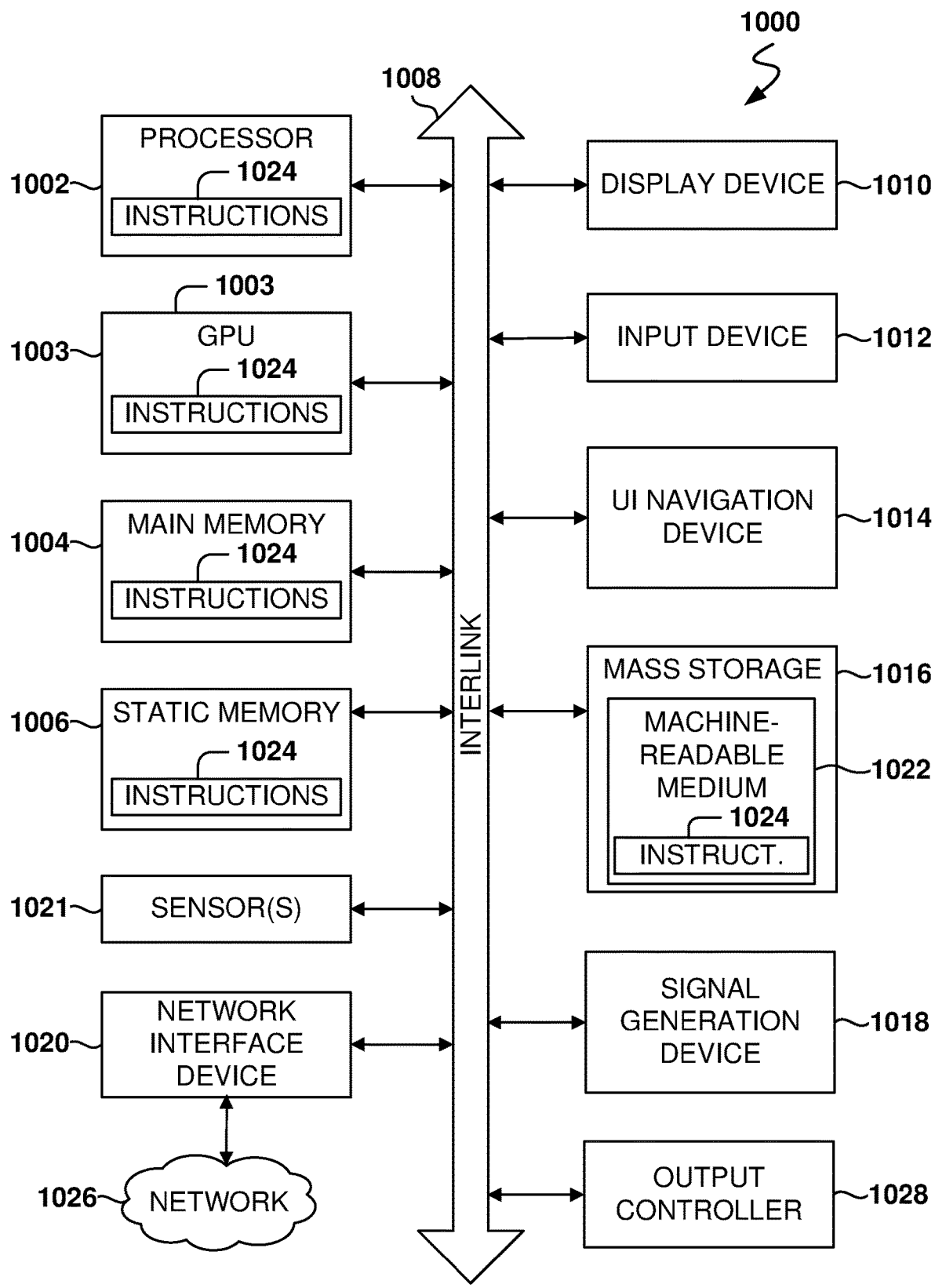
FIG. 10 is a block diagram illustrating an example of a machine upon or by which one or more example process embodiments described herein may be implemented or controlled.

FIG. 10 is a block diagram illustrating an example of a machine 1000 upon or by which one or more example process embodiments described herein may he implemented or controlled. In alternative embodiments, the machine 1000 may operate as a standalone device or may be connected (e.g., networked) to other machines. In a networked deployment, the machine 1000 may operate in the capacity of a server machine, a client machine, or both in server-client network environments. In an example, the machine 1000 may act as a peer machine in a peer-to-peer (P2P) (or other distributed) network environment. Further, while only a single machine 1000 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, a number of components, or mechanisms. Circuitry is a collection of circuits implemented in tangible entities that include hardware (e.g., simple circuits, gates, logic). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits) including a computer-readable medium physically modified (e.g., magnetically, electrically, by moveable placement of invariant massed particles) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 1000 may include a hardware processor 1002 (e.g., a central processing unit (CPU), a hardware processor core, or any combination thereof), a graphics processing unit (GPU) 1003, a main memory 1004, and a static memory 1006, some or all of which may communicate with each other via an interlink (e.g., bus) 1008. The machine 1000 may further include a display device 1010, an alphanumeric input device 1012 (e.g., a keyboard), and a UI navigation device 1014 (e.g., a mouse). In an example, the display device 1010, alphanumeric input device 1012, and UI navigation device 1014 may be a touch screen display. The machine 1000 may additionally include a mass storage device (e.g., drive unit) 1016, a signal generation device 1018 (e.g., a speaker), a network interface device 1020, and one or more sensors 1021, such as a Global Positioning System (GPS) sensor, compass, accelerometer, or another sensor. The machine 1000 may include an output controller 1028, such as a serial (e.g., universal serial bus (USB)), parallel, or other wired or wireless (e.g., infrared (IR), near field communication (NFC)) connection to communicate with or control one or more peripheral devices (e.g., a printer, card reader).

The mass storage device 1016 may include a machine-readable medium 1022 on which is stored one or more sets of data structures or instructions 1024 (e.g., software) embodying or utilized by any one or more of the techniques or functions described herein. The instructions 1024 may also reside, completely or at least partially, within the main memory 1004, within the static memory 1006, within the hardware processor 1002, or within the GPU 1003 during execution thereof by the machine 1000. In an example, one or any combination of the hardware processor 1002, the GPU 1003. the main memory 1004, the static memory 1006, or the mass storage device 1016 may constitute machine-readable media.

While the machine-readable medium 1022 is illustrated as a single medium, the term "machine-readable medium" may include a single medium, or multiple media, (e.g., a centralized or distributed database, and/or associated caches and servers) configured to store the one or more instructions 1024.

The term "machine-readable medium" may include any medium that is capable of storing, encoding, or carrying instructions 1024 for execution by the machine 1000 and that cause the machine 1000 to perform any one or more of the techniques of the present disclosure, or that is capable of storing, encoding, or carrying data structures used by or associated with such instructions 1024. Non-limiting machine-readable medium examples may include solid-state memories, and optical and magnetic media. In an example, a massed machine-readable medium comprises a machine-readable medium 1022 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks: and CD-ROM and DVD-ROM disks.

The instructions 1024 may further be transmitted or received over a communications network 1026 using a transmission meth um via the network interface device 1020.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method comprising:
   storing, in a computer memory, first scenario data received for a first control scenario, the first scenario data comprising a control scenario identifier, a first resource, an authorization control, and a scenario trigger that defines an event that causes an activation of the first control scenario for providing access to the first resource;
   monitoring for an occurrence of the scenario trigger;
   detecting an occurrence of the event associated with the scenario trigger of the first control scenario;
   determining, in response to the occurrence of the event, a set of users authorized to access the first resource, wherein determining the set of users includes accessing the stored first scenario data to determine the set of users associated with the authorization control; and
   providing access to the set of users based on the determining;
   and wherein the method further comprises providing a user interface for finding available control scenarios for a user, the user interface including an entry field for entering search query text to search by at least control scenario name, and wherein the user interface comprises a window presenting results.

2. The method as recited in claim 1, wherein monitoring for an occurrence of the scenario trigger comprises detecting one or more of: a catastrophic event, a social disturbance, a request for access to the resource from a user, a system outage, a new member added to a group associated with the first control scenario, a member leaving the group associated with the first control scenario, or a security breach.

3. The method as recited in claim 1, further comprising:
providing a requester user interface to a first user from the set of users authorized to access the first resource, the requester user interface including control scenarios visible to the first user, the control scenarios including the first control scenario, the requester user interface including an option for requesting access to the first resource of the first control scenario.

4. The method as recited in claim 1, further comprising:
providing a scenario user interface (UI) for creating the control scenario that controls access to the resource, wherein the scenario UI for creating the control scenario includes options for inputting one or more of the control scenario identifier, the first resource, the authorization control, the scenario trigger, and criteria for visibility of the control scenario to users.

5. The method as recited in claim 4, further comprising:
displaying the first control scenario at the scenario UI to the set of users authorized to access the first resource.

6. The method as recited in claim 4, wherein the first scenario data further comprises a definition of a scenario set of users eligible for requesting access to the first resource in the first control scenario, wherein the first control scenario is made visible to the scenario set of users via the scenario UI.

7. The method as recited in claim 1, wherein the authorization control is a mechanism which automatically provides access to the set of users authorized to access the first resource when the occurrence of the event associated with the scenario trigger is detected.

8. The method as recited in claim 1, wherein the authorization control comprises a mechanism which creates an authorization request for review by an administrator of the first control scenario when the occurrence of the event associated with the scenario trigger is detected.

9. The method as recited in claim 1, wherein the first scenario data further comprises an expiration date for the first control scenario.

10. The method as recited in claim 1, wherein the first resource is one or more of a door lock, data stored on a memory, a program, a web page, and an application programming interface.

11. The method as recited in claim 1, wherein the first resource is a resource managed by an active directory, wherein providing access to the set of users based on the determining comprises:
submitting a request to the active directory to enable access to the first resource by the set of users authorized to access the first resource.

12. The method as recited in claim 1, further including:
providing an attesting user interface (UI) for attesting that requirements, for accessing assets controlled by the control scenario, are met by a requesting user.

13. The method as recited in claim 1, further including detecting a scenario access request associated with a user, checking if the associated user is one of the users currently approved for access to the first resource under the control scenario, if the associated user is currently approved, checking to determine the scenario access requires renewal and if the scenario access requires renewal, checking to determine if a scenario owner approves the access request.

14. A system for performing scenario based access control comprising:
a processor; and
a memory device coupled to the processor and having a program stored thereon, which when executed by the processor cause the processor to perform operations comprising:
storing, in a computer memory, first scenario data received for a first control scenario, the first scenario data comprising a control scenario identifier, a first resource, an authorization control, and a scenario trigger that defines an event that causes an activation of the first control scenario for providing access to the first resource;
monitoring for an occurrence of the scenario trigger;
detecting an occurrence of the event associated with the scenario trigger of the first control scenario;
determining, in response to the occurrence of the event, a set of users authorized to access the first resource, wherein determining the set of users includes accessing the stored first scenario data to determine the set of users associated with the authorization control; and
providing access to the set of users based on the determining;
and wherein the method further comprises providing a user interface for finding available control scenarios for a user, the user interface including an entry field for entering search query text to search by at least control scenario name, and wherein the user interface comprises a window presenting results.

15. At least one machine-readable media including instructions that, when executed by a machine, cause the machine to perform:
storing, in a computer memory, first scenario data received for a first control scenario, the first scenario data comprising a control scenario identifier, a first resource, an authorization control, and a scenario trigger that defines an event that causes an activation of the first control scenario for providing access to the first resource;
monitoring for an occurrence of the scenario trigger;
detecting an occurrence of the event associated with the scenario trigger of the first control scenario;
determining, in response to the occurrence of the event, a set of users authorized to access the first resource, wherein determining the set of users includes accessing the stored first scenario data to determine the set of users associated with the authorization control; and
providing access to the set of users based on the determining;
and wherein the method further comprises providing a user interface for finding available control scenarios for a user, the user interface including an entry field for entering search query text to search by at least control scenario name, and wherein the user interface comprises a window presenting results.

* * * * *